US010666895B2

(12) United States Patent
Okada

(10) Patent No.: US 10,666,895 B2
(45) Date of Patent: May 26, 2020

(54) DISPLAY CONTROL APPARATUS AND METHOD OF CONTROLLING THE APPARATUS

(71) Applicant: CANON KABUSHIKI KAISHA, Tokyo (JP)

(72) Inventor: Koichi Okada, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/059,983

(22) Filed: Aug. 9, 2018

(65) Prior Publication Data

US 2019/0068915 A1 Feb. 28, 2019

(30) Foreign Application Priority Data

Aug. 31, 2017 (JP) .................................. 2017-167288

(51) Int. Cl.
*H04N 5/92* (2006.01)
*H04N 5/232* (2006.01)
*H04N 9/804* (2006.01)
*H04N 5/85* (2006.01)
*H04N 5/76* (2006.01)
*H04N 5/77* (2006.01)

(52) U.S. Cl.
CPC ............ *H04N 5/92* (2013.01); *H04N 5/23245* (2013.01); *H04N 5/232935* (2018.08); *H04N 5/772* (2013.01); *H04N 5/85* (2013.01); *H04N 9/8042* (2013.01)

(58) Field of Classification Search
CPC .............. H04N 5/772; H04N 5/23293; H04N 2101/00; H04N 5/23245; H04N 5/765; H04N 5/232; H04N 5/907; H04N 9/7921; H04N 5/775; H04N 1/2112; H04N 5/781; H04N 9/8205; H04N 9/8042; H04N 5/85; H04N 1/0044; H04N 9/8047; H04N 5/782; H04N 9/8063; H04N 5/23222; H04N 9/8227; H04N 5/23216; H04N 21/4334; H04N 21/47214; G11B 27/034; A61B 5/0432
USPC .................................. 386/223–230, 239–248
See application file for complete search history.

(56) References Cited

U.S. PATENT DOCUMENTS

2008/0094476 A1* 4/2008 Whitehead ............. H04N 5/232
 348/207.1
2014/0168470 A1* 6/2014 Yoshino ................ G06F 3/0488
 348/231.7

(Continued)

FOREIGN PATENT DOCUMENTS

JP 2004-254073 A 9/2004
JP 2005-020484 A 1/2005

*Primary Examiner* — Hung Q Dang
(74) *Attorney, Agent, or Firm* — Canon U.S.A., Inc. IP Division

(57) ABSTRACT

A display control apparatus includes a recording control unit that controls recording data acquired from a recording unit so as to be recorded on a first recording unit, an accepting unit that accepts an instruction concerning recording from a user, and a control unit that controls the recording data acquired from the recording unit before the instruction is accepted so as to be recorded upon acceptance of the instruction by the accepting unit and that controls display corresponding to the amount of recording data to be recorded on the first recording unit so as to be displayed in a display unit before the accepting unit accepts the instruction.

18 Claims, 13 Drawing Sheets

(56) References Cited

U.S. PATENT DOCUMENTS

2016/0191818 A1* 6/2016 Matsushima ........ H04N 5/2621
  386/224
2016/0227095 A1* 8/2016 Yoshizawa ............. G03B 17/38

* cited by examiner

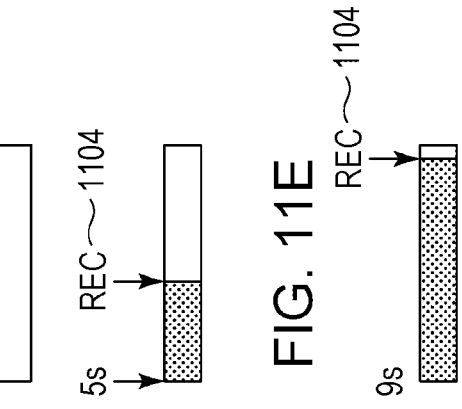
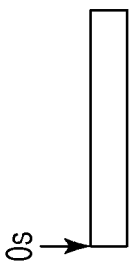
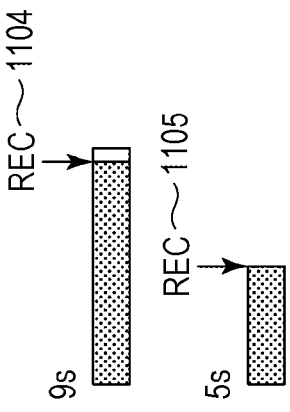
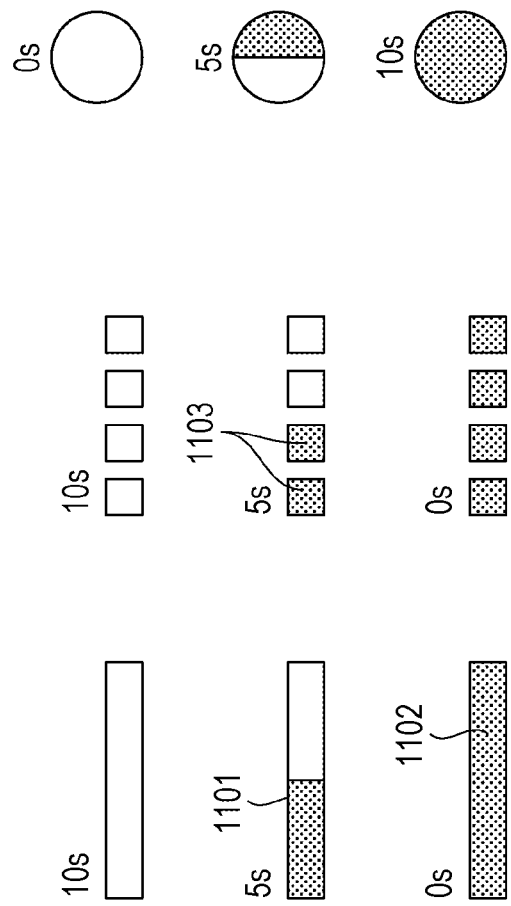
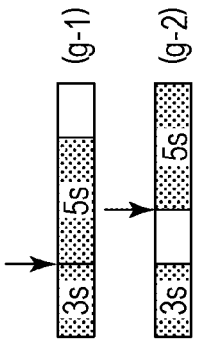
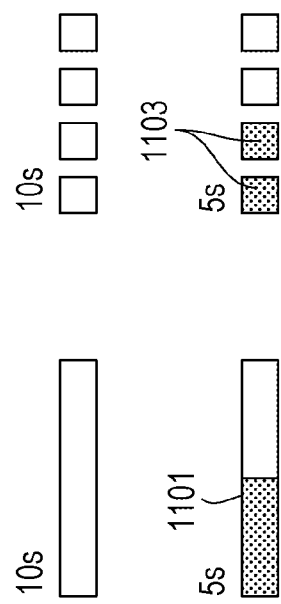
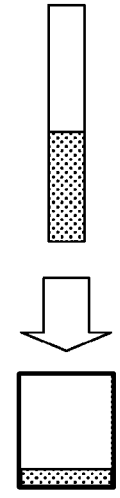

DISPLAY CONTROL APPARATUS AND METHOD OF CONTROLLING THE APPARATUS

BACKGROUND

Field of the Disclosure

The present disclosure relates to a display control apparatus that displays guide information about image data to be recorded and a method of controlling the display control apparatus.

Description of the Related Art

Triggers to instruct high-speed shooting (shooting an image of an object that varies at a high speed and recording the shot image) include a trigger used when a recording instruction is issued before a phenomenon to be recorded and a trigger used when the recording instruction is issued after a phenomenon to be recorded. Japanese Patent Laid-Open No. 2004-254073 discloses a front trigger (or a start trigger) that is given immediately before a phenomenon is started to start storage of a shot image and an end trigger in which, after a phenomenon is detected, the last image that has been temporarily stored is moved to a recording medium. In addition, in shooting for which a shooting time is determined in advance, a method of indicating that the shooting time is limited to a user is proposed. Japanese Patent Laid-Open No. 2005-20484 discloses a method of counting a predetermined time, such as 20 seconds, at a start of shooting and gradually shortening a period at which a recording lamp blinks in accordance with the remaining time of the recording.

With the method disclosed in Japanese Patent Laid-Open No. 2004-254073, the user is not capable of knowing how long the recording has been made in the case of the end trigger. With the method disclosed in Japanese Patent Laid-Open No. 2005-20484, since no notification is made to the user unless shooting is started, the user is not capable of knowing the amount of recording before the shooting is started.

SUMMARY

The present disclosure provides a display control apparatus that enables a user to get guide information about image data to be recorded during shooting of the image data.

According to an aspect of the present disclosure, there is provided a display control apparatus including an acquiring unit configured to acquire image data captured by an imaging unit; an accepting unit configured to accept a recording instruction; a switching unit configured to be capable of switching between a first recording mode in which the image data acquired by the acquiring unit before the recording instruction is accepted is recorded on a recording medium and a second recording mode in which the image data acquired by the acquiring unit after the recording instruction is accepted is recorded on the recording medium; and a display control unit configured to perform control such that guide information concerning the image data to be recorded on the recording medium is displayed in accordance with the recording instruction. The display control unit performs control such that the guide information is displayed so as to increase an amount with time in the first recording mode and the guide information is displayed so as to decrease the amount with time in the second recording mode.

Further features in the present disclosure will become apparent from the following description of exemplary embodiments with reference to the attached drawings.

BRIEF DESCRIPTION OF THE DRAWINGS

FIG. 11A to FIG. 11G illustrate other examples of display.

DESCRIPTION OF THE EMBODIMENTS

Exemplary embodiments of the present disclosure will herein be described with reference to the drawings.

Figure 1A:
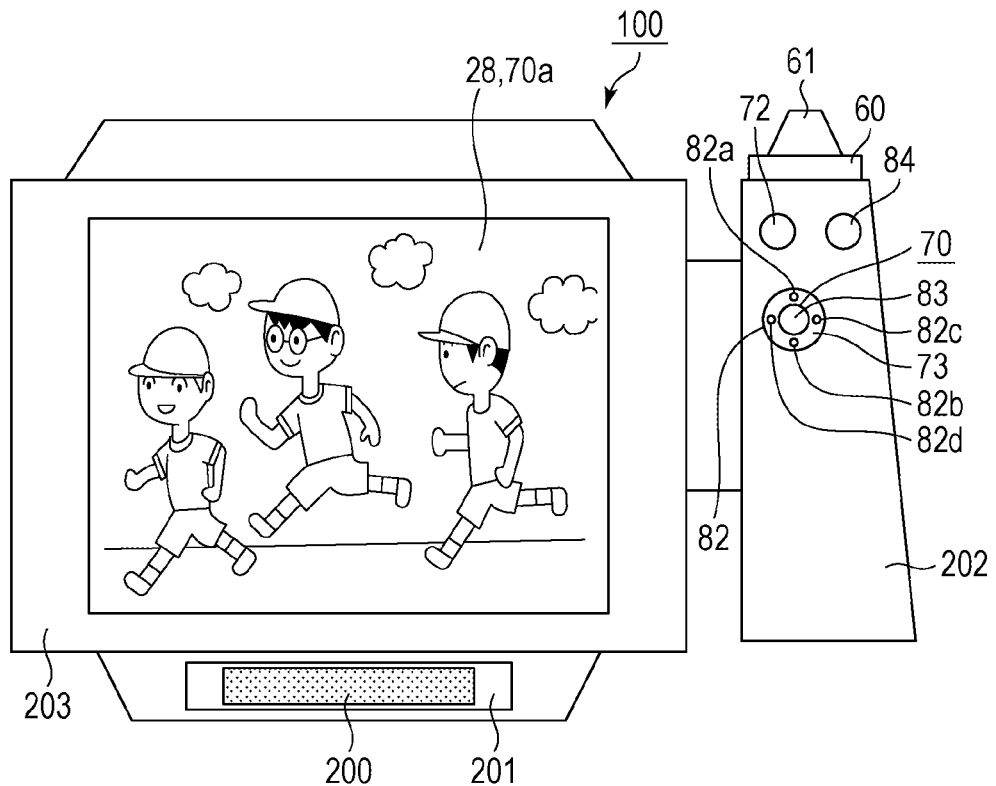
FIG. 1A and FIG. 1B are external views of a digital camera.
Figure 1B:
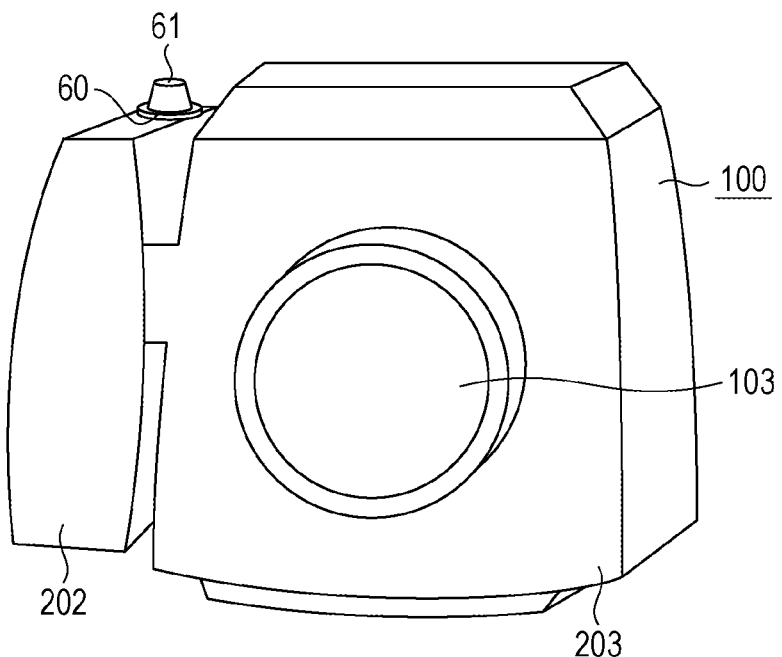

FIG. 1A and FIG. 1B are external views of a digital camera 100, which is an example of a display control apparatus according to an embodiment of the present disclosure. The digital camera 100 is mainly composed of a main unit 203 and a grip unit 202. FIG. 1A is an external view of the digital camera 100, viewed from a display unit 28 side. FIG. 1B is an external view of the digital camera 100, viewed from an imaging lens 103 side.

The display unit 28 is included in the main unit 203. An image and/or a variety of information is displayed in the display unit 28. A touch panel 70a capable of detecting a touch operation is disposed so as to be superposed on the display unit 28.

A shutter button 61 included in the grip unit 202 is an operation unit (a shooting instruction unit) used to issue a shooting instruction. A mode selector switch 60 is an operation unit used to switch between various modes. An operation unit 70 is composed of operation members, such as various switches, buttons, and a touch panel, which accepts various operations from a user. A control wheel 73 is an operation member that is included in the operation unit 70 and that is capable of rotating. An arrow key 82 is provided in four directions of the control wheel 73 and pressing any of an up button 82a, a down button 82b, a right button 82c, and a left button 82d of the arrow key 82 enables a selected item to be moved in the corresponding direction. A SET button 83 that is provided at the center of the control wheel 73 and the arrow key 82 is an operation unit used to set a selected item. Pressing a menu button 84 displays a menu screen in the display unit 28. Settings concerning shooting and switching of the shooting mode are capable of being made on the menu screen. A power switch 72 is a push button used to switch between power-on and power-off. A recording medium 200 is a recording unit, such as a memory card or a hard disk. The recording medium 200 is loaded in a recording medium slot 201. The recording medium 200 loaded in the recording medium slot 201 is capable of communication with the digital camera 100 for recording and playback. A state is illustrated in FIG. 1A in which the cover of the recording medium slot 201 is opened and part of the recording medium 200 is ejected from the recording medium slot 201 to be exposed from the recording medium slot 201. The imaging lens 103 is used to acquire an image of an object.

Figure 2:
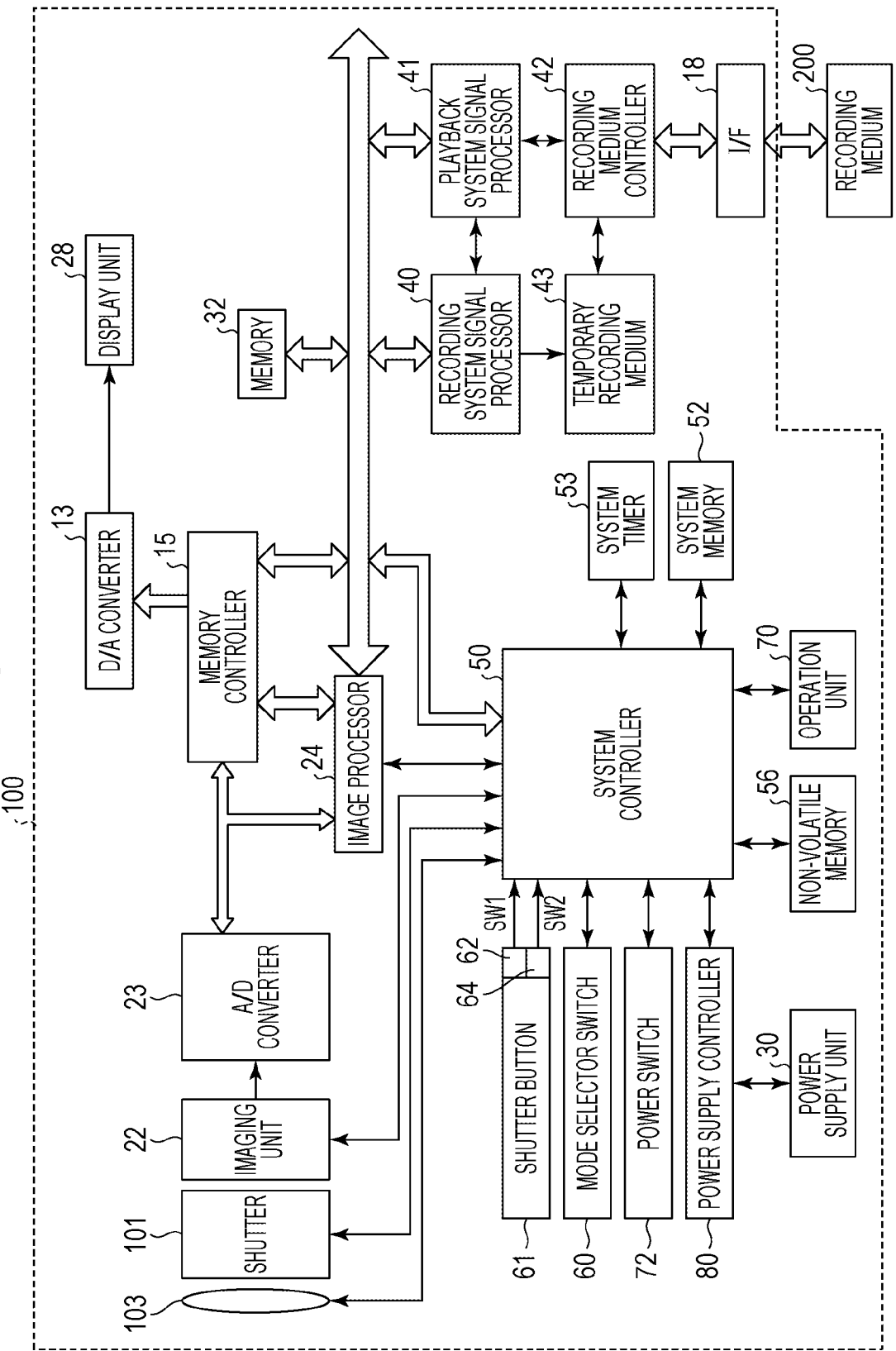
FIG. 2 is a block diagram illustrating an exemplary configuration of the digital camera.

FIG. 2 is a block diagram illustrating an exemplary configuration of the digital camera 100 according to the present embodiment.

Referring to FIG. 2, the imaging lens 103 is a lens group including a zoom lens and a focus lens. A shutter 101 has an aperture function. An imaging unit 22 is an imaging device that converts an optical image into an electrical signal and that is composed of, for example, a charge coupled device (CCD) or a complementary metal oxide semiconductor (CMOS). An analog-to-digital (A/D) converter 23 converts an analog signal into a digital signal. The A/D converter 23 is used to convert an analog signal output from the imaging unit 22 into a digital signal.

An image processor 24 performs resizing, such as certain pixel interpolation or reduction, or color conversion of data supplied from the AD converter 23 or data supplied from a memory controller 15. In addition, the image processor 24 performs certain arithmetic processing using image data that is captured and a system controller 50 performs exposure control and ranging control based on the result of the arithmetic processing. As a result, through-the-lens (TTL) auto-focusing (AF), automatic exposure (AE), and pre-flashing (EF) are performed. Furthermore, the image processor 24 performs certain arithmetic processing using image data that is captured and performs TTL automatic white balancing (AWB) based on the result of the arithmetic processing.

The data output from the A/D converter 23 is directly written into a memory 32 via the image processor 24 and the memory controller 15 or via the memory controller 15. The memory 32 stores image data that is captured by the imaging unit 22 and that is converted into digital data by the A/D converter 23 and image data to be displayed in the display unit 28. The memory 32 has a storage capacity sufficient to store still images of a certain number or a movie and audio for a certain time period.

The memory 32 also functions as an image display memory (video memory). A digital-to-analog (D/A) converter 13 converts image display data stored in the memory 32 into an analog signal and supplies the analog signal to the display unit 28. The image data for display written into the memory 32 is displayed in the display unit 28 via the D/A converter 13 in the above manner. The display unit 28 performs display corresponding to the analog signal from the D/A converter 13 on a display, such as a liquid crystal display (LCD). The digital camera 100 is capable of functioning as an electronic viewfinder to perform through-image display (live view display) by performing the digital-to-analog conversion to the digital signals that are subjected to the analog-to-digital conversion in the AD converter 23 and that are accumulated in the memory 32 in the D/A converter 13, sequentially transferring the analog signals to the display unit 28, and displaying the analog signals in the display unit 28.

A non-volatile memory 56 is an electrically erasable-recordable memory and, for example, an electrically erasable programmable read only memory (EEPROM) is used as the non-volatile memory 56. For example, constants for operating the system controller 50 and programs are stored in the non-volatile memory 56. The programs here mean computer programs used to perform the processes in various flowcharts described below in the present embodiment.

The system controller 50 is a processor that controls the entire digital camera 100. The system controller 50 executes the programs recorded in the non-volatile memory 56, which are described above, to realize the processes described below in the present embodiment. A random access memory (RAM) is used as a system memory 52. The constants for operating the system controller 50, variables, the programs read out from the non-volatile memory 56, and so on may be stored in the system memory 52. In addition, the system controller 50 controls the memory 32, the D/A converter 13, the display unit 28, and so on to perform display control. The system controller 50 may be realized by one processor or may be realized by multiple processors. Alternatively, the functions of multiple controllers, such as the system controller 50, the memory controller 15, the image processor 24, a recording system signal processor 40, a playback system signal processor 41, and a recording medium controller 42 may be realized by one processor.

A system timer 53 is a time measuring unit that measures times used in a variety of control and the time of a clock incorporated in the system timer 53.

The mode selector switch 60, the shutter button 61, and the operation unit 70 are operation units used to input various operation instructions into the system controller 50.

The mode selector switch 60 switches the operation mode of the system controller 50 to a still image mode, a movie mode, a playback mode, or the like. The still image mode includes an automatic shooting mode, an automatic scene determination mode, a manual mode, various scene modes that are set for shooting scenes, a program AE mode, a custom mode, and so on. The user is capable of directly switching the operation mode to any of these modes included in the menu button with the mode selector switch 60. Alternatively, after temporarily switching to the menu button with the mode selector switch 60, the user may switch the operation mode to any of these modes included in the menu button with another operation member. Similarly, the movie mode may include multiple modes. A first shutter switch 62 is turned on while the shutter button 61 of the digital camera 100 is being operated, that is, in a state in which the shutter button 61 is pressed halfway (a shooting preparation instruction) to generate a first shutter switch signal SW1. An operation, such as the auto-focusing (AF), the automatic exposure (AE), the automatic white balancing (AWB), or the pre-flashing (EF) is started in response to the first shutter switch signal SW1.

A second shutter switch 64 is turned on when the operation of the shutter button 61 is completed, that is, in a state in which the shutter button 61 is fully pressed (the shooting instruction) to generate a second shutter switch signal SW2. The system controller 50 starts a series of shooting operations (shooting control) from reading out of a signal from the imaging unit 22 to writing of image data into the recording medium 200 in response to the second shutter switch signal SW2.

A power supply controller 80 is composed of, for example, a battery detection circuit, a direct current to direct current (DC-DC) converter, and a switch circuit that switches the block to be electrified, and detects whether the battery is mounted, the kind of the battery, and the remaining battery level. The power supply controller 80 controls the DC-DC converter based on the results of the detection and an instruction from the system controller 50 to supply required voltage to each block including the recording medium 200 during a required time period. The power switch 72 accepts switching between turning-on and turning-off of the power supply and the power supply controller 80 controls the power supply to the digital camera 100 in accordance with the turning-on or turning-off accepted by the power switch 72.

A power supply unit 30 is composed of a primary battery, such as an alkaline battery or a lithium battery, a secondary battery, such as a NiCd battery, a NiMH battery, or a Li battery, an alternate current (AC) adaptor, and so on. A recording medium interface (I/F) 18 is an interface with the recording medium 200, such as a memory card or a hard disk. The recording medium 200 is, for example, a memory card for recording an image that is captured and is composed of a semiconductor memory, an optical disc, a magnetic disk, or the like.

Signal processing concerning recording is performed by the recording system signal processor 40 and signal processing concerning playback is performed by the playback system signal processor 41. The recording system signal processor 40 performs video compression to a video signal supplied from the image processor 24. The compressed video is temporarily stored in a temporary recording medium 43 and, then, is supplied to the recording medium 200 via the recording medium controller 42 to be recorded. The recording medium controller 42 (the temporary recording medium 43) is capable of being connected to the recording medium 200 via the I/F 18. The temporary recording medium 43 is a buffer composed of, for example, a dynamic RAM (DRAM) or a static RAM (SRAM) and is required to achieve high-speed reading and writing in order to temporarily record a video. However, since the recording potential of the temporary recording medium 43 is lower than the upper limit of the recording potential of the recording medium 200, the recording may be stopped when the amount of recording of the temporary recording medium 43 reaches the recording potential even if the recording capacity of the recording medium 200 remains. The recording medium 200 is composed of, for example, a hard disk, a digital versatile disc (DVD), or a flash memory and a video signal is recorded on the recording medium 200 under the control of the system controller 50. The recorded video signal is read out into the recording medium controller 42 in playback in response to an operation with the operation unit 70 and is displayed in the display unit 28 via the playback system signal processor 41.

Figure 3A:
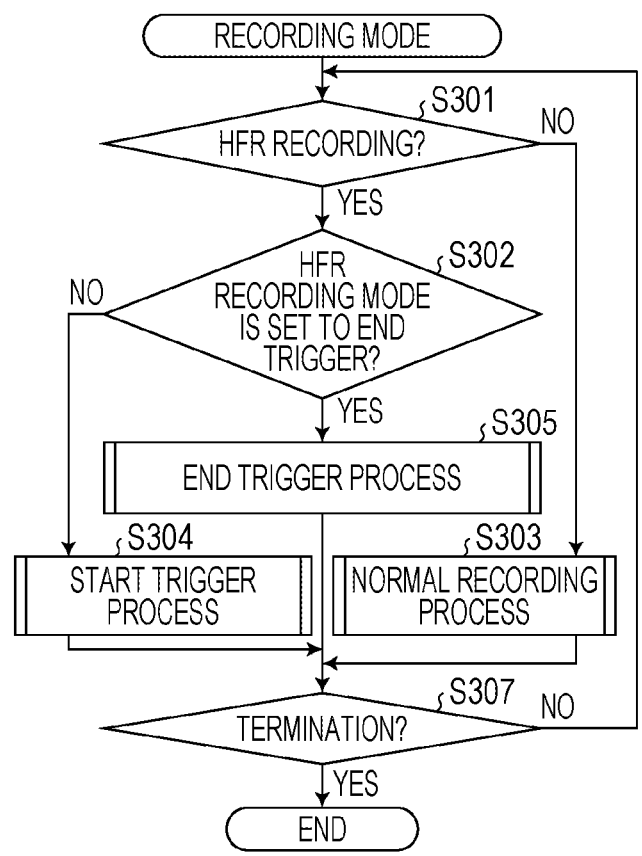
FIG. 3A and FIG. 3B are flowcharts illustrating an exemplary recording mode process and an exemplary normal recording process, respectively.
Figure 3B:
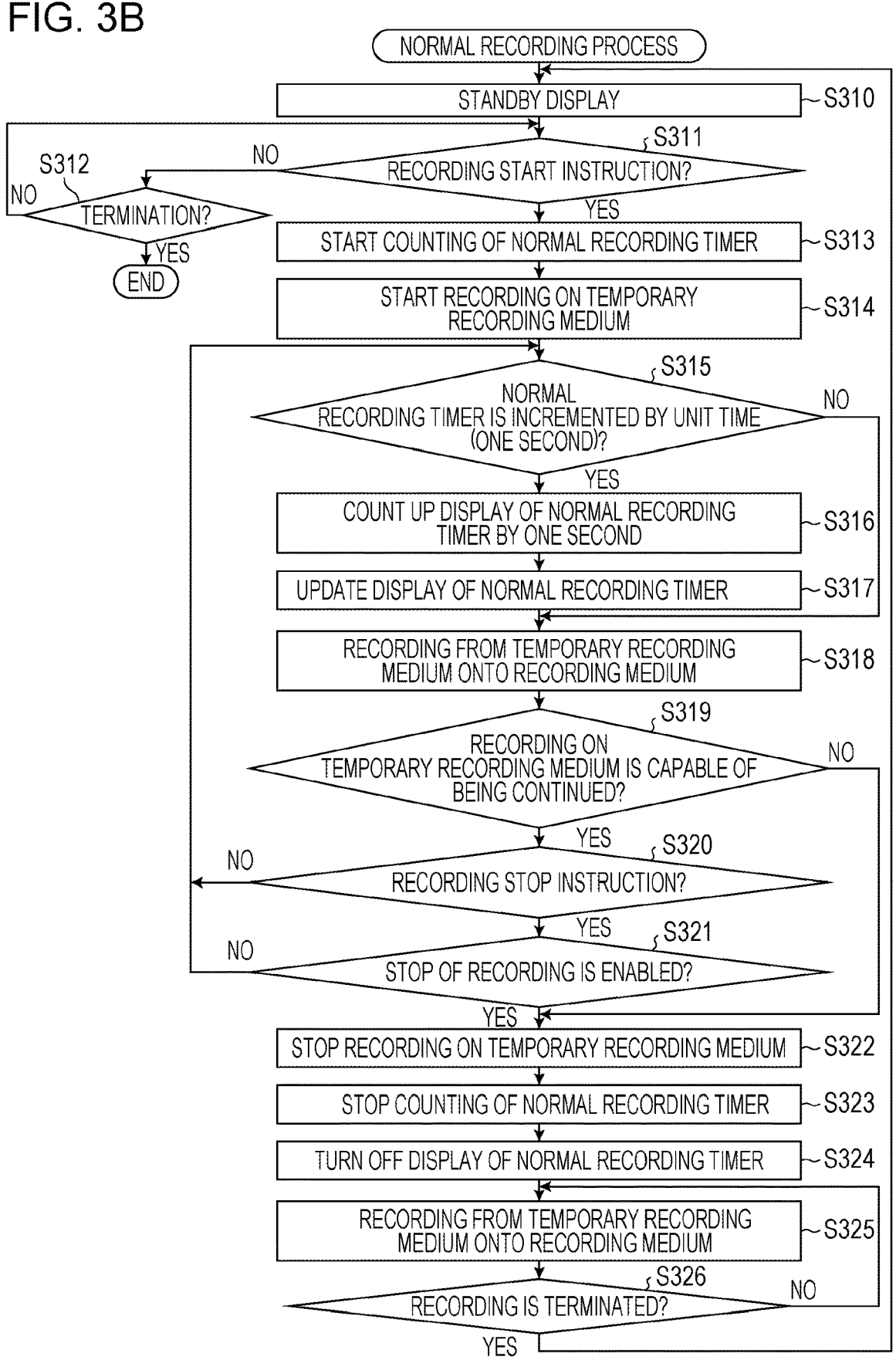

FIG. 3A and FIG. 3B are flowcharts illustrating an exemplary recording mode process and an exemplary normal recording process in the present embodiment, respectively. The flowchart in FIG. 3A is started when the digital camera 100 is turned on and is in a state in which recording on the recording medium is enabled. The flowchart in FIG. 3B is started in Step S303 in FIG. 3A. These processes are realized by the system controller 50 that executes the programs recorded in the non-volatile memory 56, which may be included in the system memory 52.

Figure 7A:
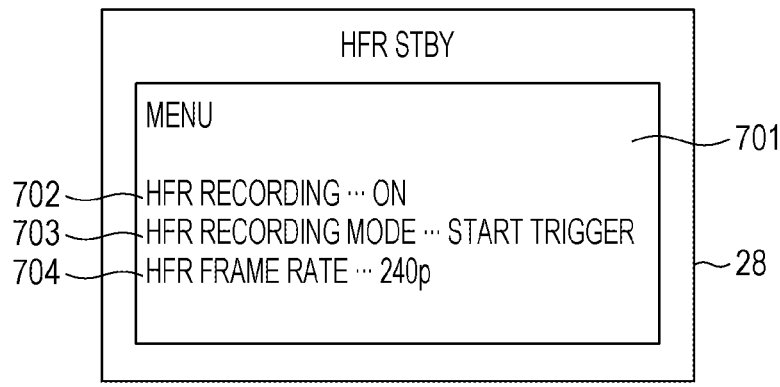
FIG. 7A illustrates a high frame rate setting screen.

Referring to FIG. 3A, in Step S301, the system controller 50 determines whether the current recording mode is set to a high frame rate recording (HFR recording), which is high-speed shooting. The high frame rate recording (high frame rate shooting) is capable of being set on a standby screen of the recording mode (in a state in which a live view (LV) image is displayed and the recording on the recording medium 200 is not performed). When the menu button 84 is pressed on the standby screen, a screen for setting the high frame rate, such a setting screen 701 in FIG. 7A, is displayed in the display unit 28. On the setting screen 701, an item 702 is used to set the HFR recording. Setting the setting screen 701 to ON sets the HFR recording. An item 703 is used to set the HFR recording mode to an end trigger or a start trigger. An item 704 is used to set the frame rate in the HFR recording. In this example, any of 120 frames per second (fps), 240 fps, 480 fps, and 960 fps is capable of being set as the frame rate of the digital camera 100. If the frame rate of the digital camera 100 is set to 120 fps when the HFR recording is set to ON in the item 702, the shooting is performed in the HFR recording, as in the normal recording, without imposing a restriction on the recording time, which is imposed at 240 fps (however, the recording is restricted by the free space on the recording medium and the remaining battery level). This is because, since the recording process is performed without a large delay in the amount of recording data at 120 fps, it is not necessary to impose restrictions on the recording time and the recording speed. In contrast, if the frame rate of the digital camera 100 is set to 240 fps or higher (480 fps or 960 fps), it takes time to perform the recording process. Accordingly, the recording time is set so as to be within a predetermined time, such as 10 seconds, in order to prevent the recording from being disabled on the way because of the slow recording process. Setting the recording time in the above manner enables the user to acquire a desired moving image within the set recording time, without stopping of the recording on the way or interruption of the recording because of the slow recording process. The process goes to Step S302 if the system controller 50 determines that the current recording mode is set to the HFR recording (YES in Step S301) and, otherwise (NO in Step S301), the process goes to Step S303.

In Step 302, the system controller 50 determines whether the HFR recording mode is set to the end trigger. The HFR recording includes the end trigger and the start trigger, and the recording time is restricted in both the end trigger and the start trigger. As described above, since the amount of recording data is increased and it takes a time for the processing in the HFR recording because of a high frame rate, such as 240 fps, the recording data is temporarily recorded in the temporary recording medium 43, such as a buffer, and then is recorded on the recording medium 200. In the end trigger, a movie of a high frame rate is constantly recorded on the temporary recording medium 43, such as a buffer, every predetermined time, such as 10 seconds, and the recorded moving image is discarded (deleted) after the predetermined time elapses with no instruction from the user. Updating the video data on the temporary recording medium 43 every predetermined time in the above manner does not cause the temporary recording medium 43 to be full even at a high frame rate, such as 240 fps, to enable a recording instruction to be accepted any time. If the recording instruction is issued from the user before the predetermined time elapses, the moving image recorded in the buffer from zero seconds to the time when the recording instruction is issued is recorded on the recording medium 200. In the start trigger, the constant recording on the temporary recording medium 43, such as a buffer, is not performed, the recording on the buffer is started in response to the shooting instruction from the user, and the recording from the buffer onto the recording medium 200 is performed after the predetermined time, such as 10 seconds, elapses or in response to a recording stop instruction from the user. Whether the HFR recording mode is set to the end trigger or the start trigger is capable of being set on the setting screen

701 described above in Step S301 and the HFR recording mode is capable of being set to the end trigger or the start trigger with the item 703 on the setting screen 701. The process goes to Step S305 if the system controller 50 determines that the HFR recording mode is set to the end trigger (YES in Step S302) and, otherwise (NO in Step S302), the process goes to Step S304. The normal recording, and the start trigger and the end trigger in the HFR recording, may be set not on the menu screen but in response to an operation with a button that is allocated in advance.

In Step S303, the system controller 50 performs the normal recording process. The normal recording process will be described below with reference to the flowchart in FIG. 3B.

In Step 304, the system controller 50 performs a start trigger process. The start trigger process will be described below with reference to a flowchart of the start trigger process in FIG. 4.

In Step 305, the system controller 50 performs an end trigger process. The end trigger process will be described below with reference to a flowchart of the end trigger process in FIG. 5.

In Step 307, the system controller 50 determines whether the recording mode is to be terminated. The recording mode is terminated in response to a transition to the playback mode or a turning off of the digital camera 100. The process in FIG. 3A is terminated if the system controller 50 determines that the recording mode is to be terminated (YES in Step S307) and, otherwise (NO in Step S307), the process goes back to Step S301.

The normal recording process in FIG. 3B will now be described. The normal recording process is started in Step S303 in FIG. 3A. The normal recording process is realized by the system controller 50 that executes the programs recorded in the non-volatile memory 56, which may be included in the system memory 52.

Figure 7B:
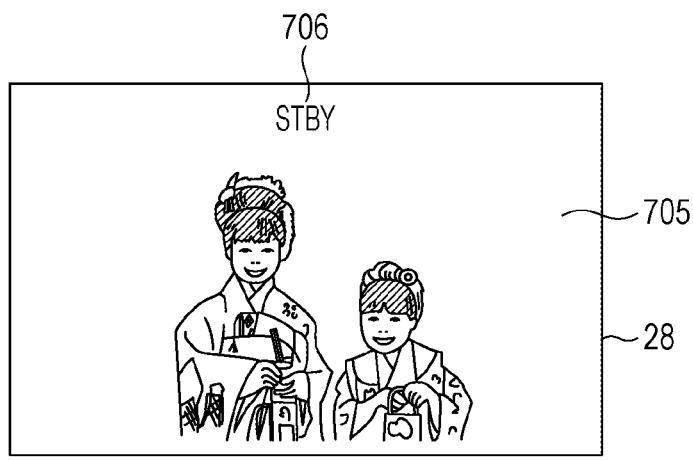
FIG. 7B and FIG. 7C illustrate examples of display in the normal recording process.

Referring to FIG. 3B, in Step S310, the system controller 50 provides a standby display, as illustrated on a standby screen 705 in FIG. 7B, in the display unit 28. In the standby display, a guide 706 indicating a standby state (a state in which start of recording is acceptable) is displayed.

In Step S311, the system controller 50 determines whether a recording start instruction is issued. The recording start instruction is made by pressing the shutter button 61 (the shooting instruction is acceptable). The process goes to Step S313 if the system controller 50 determines that the recording start instruction is issued (YES in Step S311) and, otherwise (NO in Step S311), the process goes to Step S312.

In Step S312, the system controller 50 determines whether the normal recording process is to be terminated. The normal recording process is terminated in response to switching to the HFR recording, transition to the playback mode, or turning off of the digital camera 100. The normal recording process is terminated if the system controller 50 determines that the normal recording process is to be terminated (YES in Step S312) and, otherwise (NO in Step S312), the process goes back to Step S311.

In Step S313, the system controller 50 starts the counting of a normal recording timer. In other words, the system controller 50 starts the counting of a shooting time (recording timer) in the system timer 53 as the normal recording timer in response to the recording start instruction determined in Step S311 in Step S313. A movie is recorded in the system memory 52 to update the data in the system memory 52 each time a unit time elapses since the counting started in Step S313 (for example, every one second).

In Step S314, the system controller 50 starts recording of the movie on the temporary recording medium 43. The display in the display unit 28 is switched from the guide 706 indicating the standby state to a guide 707 indicating that a movie is being recorded, as illustrated on a recording screen 709 in FIG. 7C. In addition, a guide 708 indicating the recording time is displayed in the display unit 28. At start of the recording, the guide 708 is set to zero seconds.

In Step S315, the system controller 50 determines whether the normal recording timer, the counting of which is started in Step S313, is incremented by one second, which is the unit time, since the start of the counting or since the determination in the last S315 was affirmative. The unit time is a time when the display of the elapsed time in the normal recording timer is updated, and the display of the time in the normal recording timer is updated every one second in the present embodiment. The process goes to Step S316 if the system controller 50 determines that the normal recording timer is incremented by one second, which is the unit time (YES in Step S315) and, otherwise (NO in Step S315), the process goes to Step S318.

In Step S316, the system controller 50 counts up the display of the normal recording timer by one second to update the normal recording timer and records the display of the normal recording timer in the system memory 52.

Figure 7C:
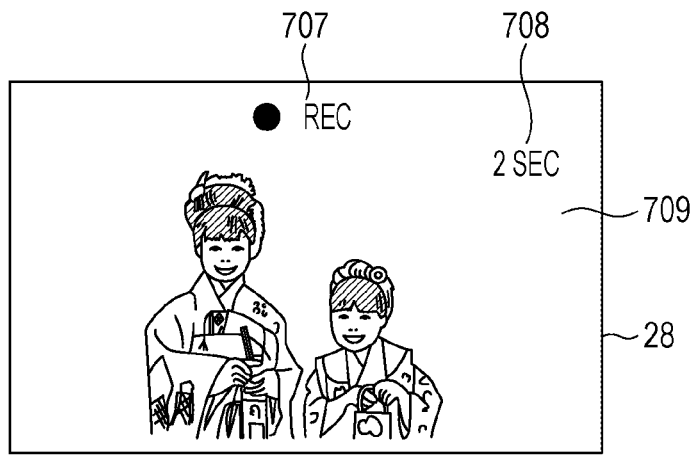

In Step S317, the system controller 50 updates the display of the elapsed time in the normal recording timer, recorded in the system memory 52. Since the guide 708 in FIG. 7C is set to two seconds, the guide 708 is switched to three seconds when one second, which is the unit time, elapses. The display indicating the shooting time period is updated each time the unit time elapses in the above manner. When the unit time is one second, the display of the shooting time is updated every one second in a manner of one seconds, two seconds, three seconds, etc.

In Step S318, the system controller 50 perform is recording from the temporary recording medium 43 onto the recording medium 200. In other words, the recording data accumulated in the buffer is moved to the recording medium 200, which is a non-volatile recording medium. Step S318 may not be performed every one second and may be intermittently performed, for example, every several seconds.

In Step S319, the system controller 50 determines whether the recording on the temporary recording medium 43 is capable of being continued. Although the recording from the temporary recording medium 43 onto the recording medium 200 is performed in Step S318, the recording capacity of the temporary recording medium 43 becomes full if the recording speed onto the temporary recording medium 43 exceeds the recording speed from the temporary recording medium 43 onto the recording medium 200. When the recording capacity of the temporary recording medium 43 is full, the recording process may not be capable of being continued. In other words, the system controller 50 determines whether the recording of the recording data onto the temporary recording medium 43 is still enabled in Step S319. The process goes to Step S320 if the system controller 50 determines that the recording on the temporary recording medium 43 is capable of being continued (YES in Step S319) and, otherwise (NO in Step S319), the process goes to Step S322.

In Step S320, the system controller 50 determines whether the recording stop instruction is issued. The recording stop instruction is made by pressing the shutter button 61. The process goes to Step S321 if the system controller 50 determines that the recording stop instruction is issued (YES in Step S320) and, otherwise (NO in Step S320), the process goes back to Step S315.

In Step S321, the system controller 50 determines whether stopping the recording is enabled. In the present embodiment, the recording data of a certain length of the recording time (0.5 seconds) is recorded as a movie. In other words, the recording data of a short recording time, such as 0.1 seconds or 0.2 seconds, is not recorded as a movie. Accordingly, stop of the recording is disabled if the elapsed time since the start of the shooting, measured by the system timer 53, is shorter than 0.5 seconds and stop of the recording is enabled if the elapsed time is longer than or equal to 0.5 seconds. The process goes to Step S322 if the system controller 50 determines that stop of the recording is enabled (YES in Step S321) and, otherwise (NO in Step S321), the process goes back to Step S315.

In Step S322, the system controller 50 stops the recording on the temporary recording medium 43.

In Step S323, the system controller 50 stops the counting of the normal recording timer, stops the counting in the system timer 53, and resets the counted time to zero seconds.

In Step S324, the system controller 50 turns off the display of the guide 708 indicating the recording time, displayed in the display unit 28.

In Step S325, the system controller 50 perform is recording from the temporary recording medium 43 onto the recording medium 200.

In Step S326, the system controller 50 determines whether the recording in Step S325 is terminated. The process goes back to Step S310 if the system controller 50 determines that the recording from the temporary recording medium 43 onto the recording medium 200 is terminated (YES in Step S326) and, otherwise (NO in Step S326), the process goes back to Step S325.

As described above, in the present embodiment, the user is capable of selecting the HFR recording or the normal recording. In the normal recording process, the recording data acquired from the time of the issuance of the recording start instruction to the time of the issuance of the recording termination instruction is capable of being recorded.

The start trigger process illustrated in FIG. 4 will now be described. The start trigger process is started in Step S304 in FIG. 3A. The start trigger process is realized by the system controller 50 that executes the programs recorded in the non-volatile memory 56, which may be included in the system memory 52.

Figure 4:
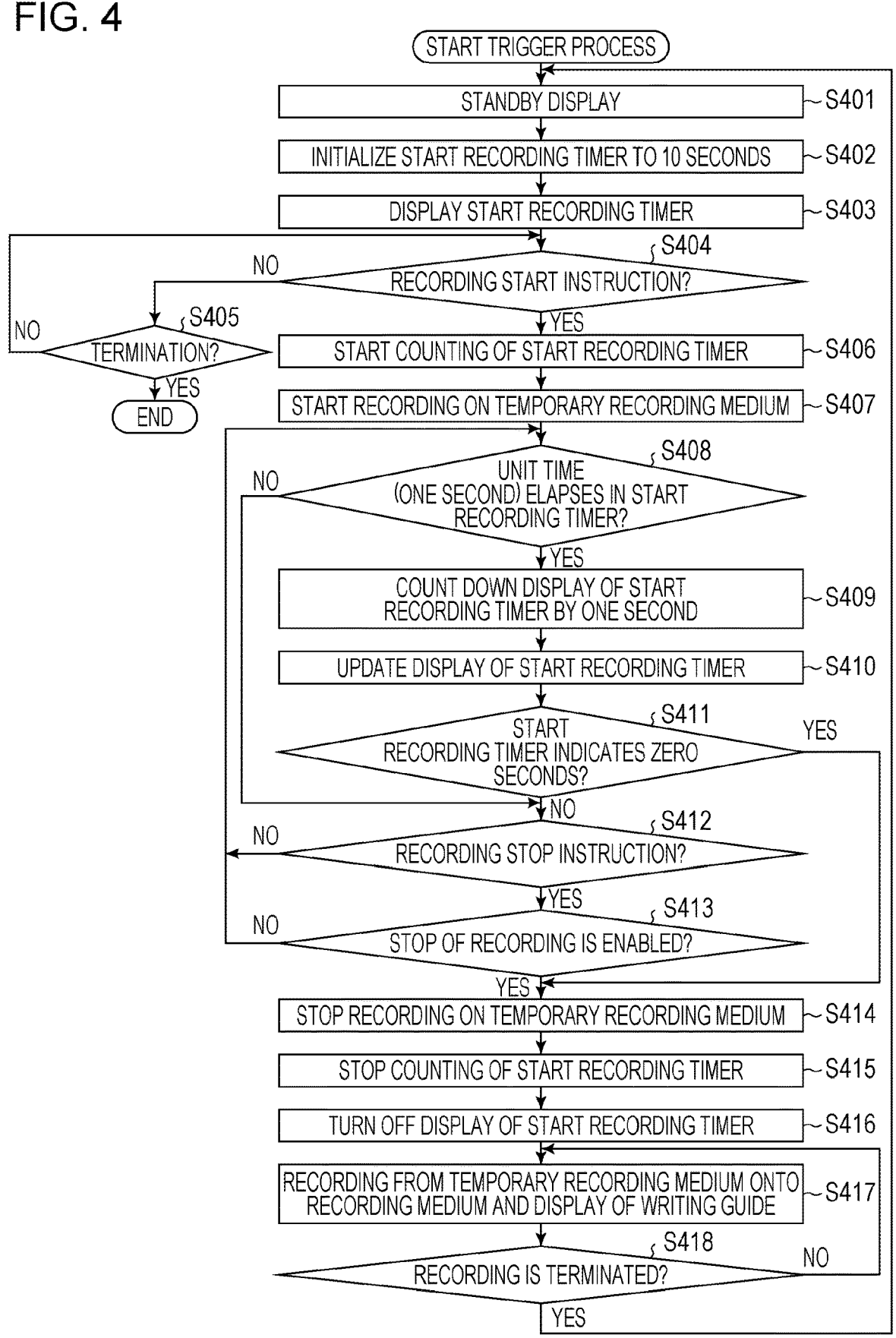
FIG. 4 is a flowchart illustrating an exemplary start trigger process.
Figure 8A:
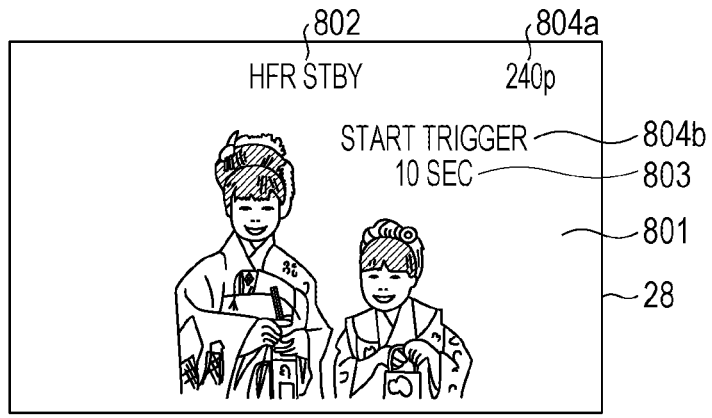
FIG. 8A to FIG. 8D illustrate examples of display in a display unit in the start trigger process.

Referring to FIG. 4, in Step S401, the system controller 50 provides a standby display, as illustrated on a standby screen 801 in FIG. 8A, in the display unit 28. In the standby display, a guide 802 indicating the standby state (the state in which start of recording is acceptable) is displayed. In addition, an item 804a indicating 240 fps, which is a recording frame rate, and an item 804b indicating that the current setting of the HFR recording is the start trigger are displayed in Step S401.

In Step S402, the system controller 50 initializes a start recording timer and records the start recording timer in the system memory 52. The start recording timer indicates the recording time recorded as the HFR recording. Since the maximum recording time of the HFR recording is 10 seconds in the present embodiment, the start recording timer is set to 10 seconds in Step S402.

In Step S403, the system controller 50 displays the start recording timer indicating the recording time, as illustrated by a guide 803 on the standby screen 801 in FIG. 8A. Since the recording of up to 10 seconds is enabled as the HFR recording in the present embodiment, the start recording timer indicates 10 seconds.

In Step S404, the system controller 50 determines whether the recording start instruction is issued. In the case of the start trigger, the recording on the temporary recording medium 43 is started in response to the recording start instruction. The recording start instruction is made by pressing the shutter button 61 (the shooting instruction is acceptable). The process goes to Step S406 if the system controller 50 determines that the recording start instruction is issued (YES in Step S404) and, otherwise (NO in Step S404), the process goes to Step S405.

In Step S405, the system controller 50 determines whether the start trigger process is to be terminated. The start trigger process is terminated in response to switching to the normal recording, switching to the end trigger, transition to the playback mode, or turning off of the digital camera 100. The start trigger process is terminated if the system controller 50 determines that the start trigger process is to be terminated (YES in Step S405) and, otherwise (NO in Step S405), the process goes back to Step S404.

In Step S406, the system controller 50 starts counting of the start recording timer, which is initialized in Step S402, because the recording start instruction was issued in Step S404. In other words, in Step S406, the system controller 50 starts counting of the shooting time (the recording timer) in the system timer 53 as the start recording timer in response to the recording start instruction determined in Step S404. The counting of the recording time in the system timer 53 is started in response to the recording start instruction determined in Step S404, the remaining recording time is updated every unit time until 10 seconds elapses, and the remaining recording time is recorded in the system memory 52 in Step S406.

Figure 8B:
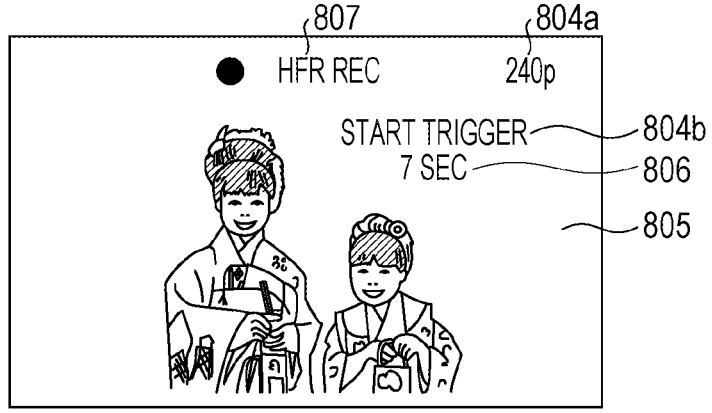

In Step S407, the system controller 50 starts recording of an image captured by the imaging unit 22 on the temporary recording medium 43. The display in the display unit 28 is switched from the guide 802 indicating the standby state to a guide 807 indicating that a movie is being recorded, as illustrated on a recording screen 805 in FIG. 8B.

In Step S408, the system controller 50 determines whether one second, which is the unit time in this embodiment, elapses in the start recording timer, the counting of which is started in Step S406. The unit time is a time when the display of the elapsed time in the start recording timer is updated, and the display of the time in the start recording timer is updated every one second in the present embodiment. The process goes to Step S409 if the system controller 50 determines that one second, which is the unit time, elapses in the start recording timer (YES in Step S408) and, otherwise (NO in Step S408), the process goes to Step S412.

In Step S409, the system controller 50 counts down the display of the start recording timer by one second to update the start recording timer and records the display of the start recording timer in the system memory 52. In other words, in Step S409, the time of the start recording timer, which is initialized to 10 seconds in Step S402, is decremented by one second from 10 seconds and the decremented time is recorded in the system memory 52. The remaining time recordable as the HFR recording is recorded in the system memory 52 in the above manner.

In Step S410, the system controller 50 updates the display of the start recording timer. Since a guide 806 in FIG. 8B indicates seven seconds, the guide 806 is switched to six seconds when one second, which is the unit time, elapses. The display indicating the shooting time period is updated every unit time.

In Step S411, the system controller 50 determines whether the start recording timer recorded in the system memory 52 is decreased to zero seconds. The process goes to Step S414 if the system controller 50 determines that the start recording timer is decreased to zero seconds, that is, that the recordable time as the HFR recording elapses (YES in Step S411) and, otherwise (NO in Step S411), the process goes to Step S412.

In Step S412, the system controller 50 determines whether the recording stop instruction is issued. The recording stop instruction is made by pressing the shutter button 61. The process goes to Step S413 if the system controller 50 determines that the recording stop instruction is issued (YES in Step S412) and, otherwise (NO in Step S412), the process goes back to Step S408.

In Step S413, the system controller 50 determines whether stopping the recording is enabled, as in Step S321. The process goes to Step S414 if the system controller 50 determines that stopping the recording is enabled (YES in Step S413) and, otherwise (NO in Step S413), the process goes back to Step S408.

In Step S414, the system controller 50 stops the recording on the temporary recording medium 43. A guide 810 in FIG. 8C indicates zero seconds if the start recording timer is decreased to zero seconds and the recording is stopped and, otherwise, the start recording timer at that time is displayed.

Figure 8C:
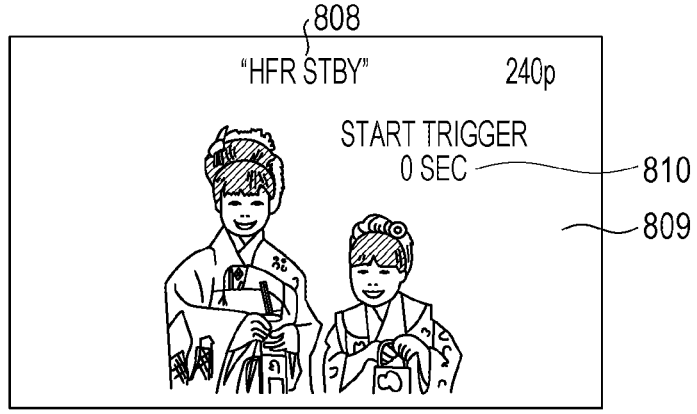

In Step S415, the system controller 50 stops the counting of the start recording timer and stops the counting in the system timer 53. If the determination in Step S411 is affirmative, a guide 808 illustrated on a recording stop screen 809 in FIG. 8C is displayed. The guide 808 indicates that the recording is stopped because the HFR recording is not capable of being continued and the recording is disabled even in the standby state. The recording stop screen 809 is displayed upon the stopping of the recording because the start recording timer has decreased to zero seconds. When the recording is stopped in response to an operation by the user, a screen illustrated in FIG. 8D described below is displayed, not the screen in FIG. 8C.

In Step S416, the system controller 50 turns off the display of the guide 810 indicating the recording time, displayed in the display unit 28.

Figure 8D:
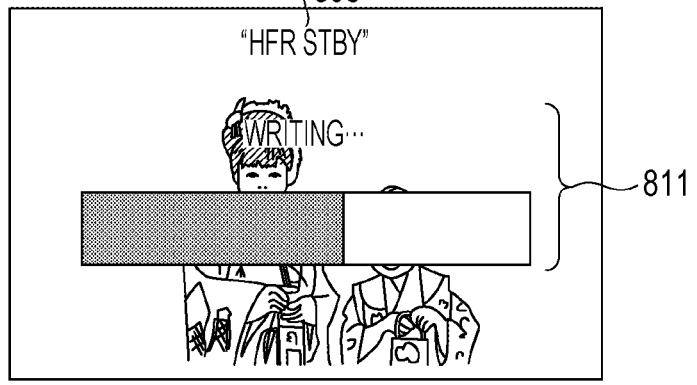

In Step S417, the system controller 50 performs recording from the temporary recording medium 43 onto the recording medium 200. When the number of frames recorded per one second in the HFR recording is 240 fps in this example, the number of frames in the HFR recording is four times greater than 60 fps in normal recording. In other words, since the recording capacity of data is four times higher than that in normal shooting, it takes a time to perform the recording from the temporary recording medium 43 onto the recording medium 200. It takes a time to perform the recording even during a restricted time of 10 seconds. The time to perform Step S417 may be twice the recording time. Step S417 includes compression of a movie, creation of a thumbnail, and so on. A writing guide 811 indicating that the recording on the recording medium 200 is being performed is displayed in the display unit 28, as illustrated in FIG. 8D, in Step S417. The writing guide 811 indicates that the writing from the temporary recording medium 43 onto the recording medium 200 is being performed and also indicates the progress of the writing.

In Step S418, the system controller 50 determines whether the recording in Step S417 is terminated. The process goes back to Step S401 if the system controller 50 determines that the recording from the temporary recording medium 43 onto the recording medium 200 is terminated (e.g., completed) (YES in Step S418) and, otherwise (NO in Step S418), the process goes back to Step S417.

As described above, in the present embodiment, the start trigger process is capable of being performed in the HFR recording, and the shooting for up to 10 seconds (for example, the playback time is 40 seconds at 240 fps) is enabled. In addition, the user is capable of knowing that the HFR recording of 10 seconds is enabled before the instruction to start the shooting is issued and knowing how long the HFR recording is enabled during the shooting. Since other shooting may not be immediately started after the recording instruction is issued because the amount of recording data is large in the HFR recording, the user may miss a shot if the shooting time is off. However, the user may easily know when the shooting is to be started in order to perform a desired shooting and when the shooting should be terminated with reference to the recording enabled time that is indicated.

The end trigger process illustrated in FIG. 5 will now be described. The end trigger process is started in Step S305 in FIG. 3A. The end trigger process is realized by the system controller 50 that executes the programs recorded in the non-volatile memory 56, which may be included in the system memory 52. In the end trigger process, an instruction is issued to the recording medium at timing different from that in the start trigger process. Specifically, the temporary recording medium 43 is refreshed every 10 seconds, the HFR recording for up to 10 seconds is recorded on the temporary recording medium 43, and the recording data recorded on the temporary recording medium 43 is moved to the recording medium 200 in response to the instruction from the user. In other words, the recording data on the temporary recording medium 43 before the timing of the instruction from the user is capable of being recorded on the recording medium 200. In the end trigger, the length of the recording time recorded on the temporary recording medium 43 is varied with the timing of the instruction from the user.

Figure 5:
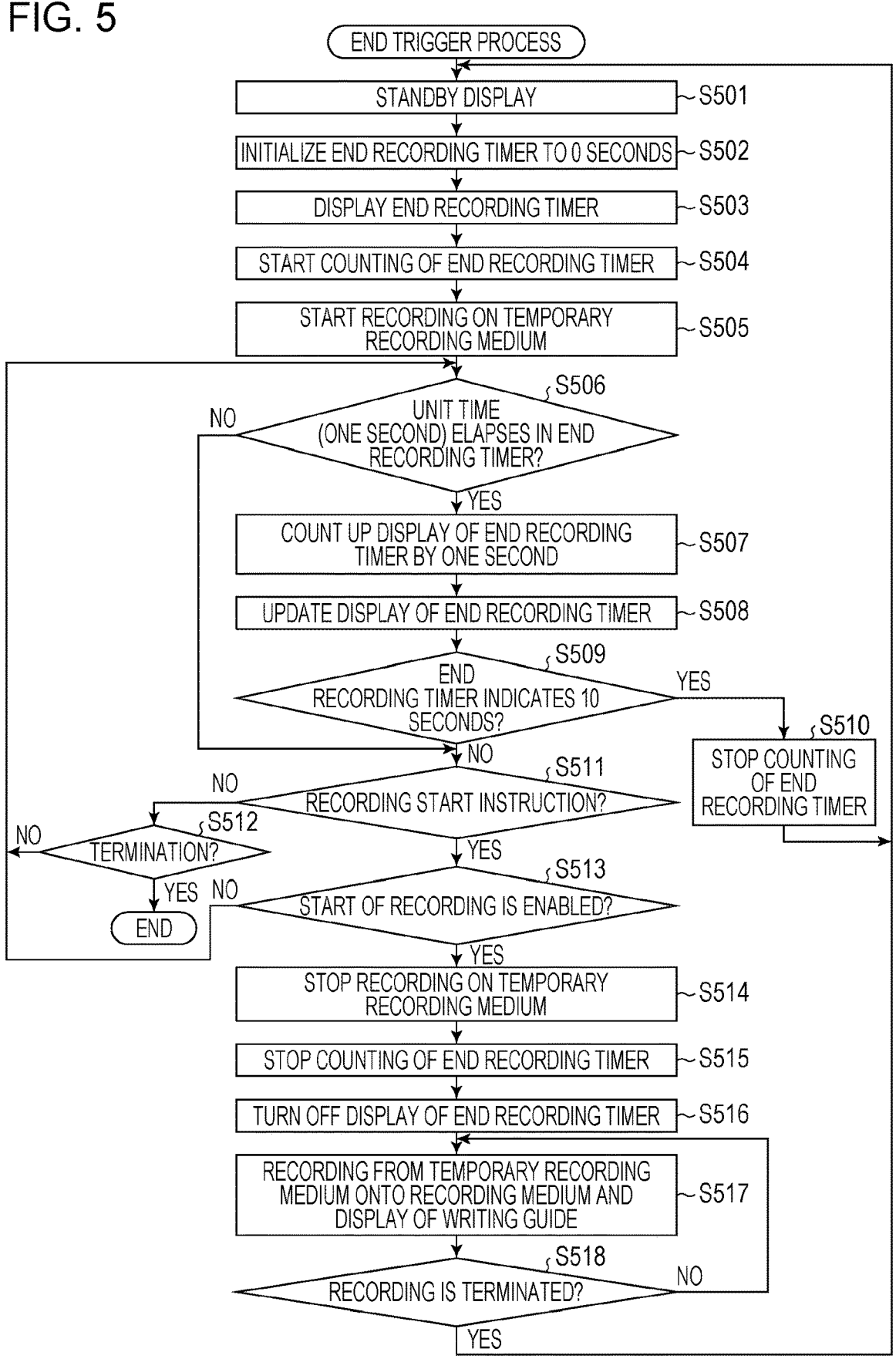
FIG. 5 is a flowchart illustrating an exemplary end trigger process.
Figure 9A:
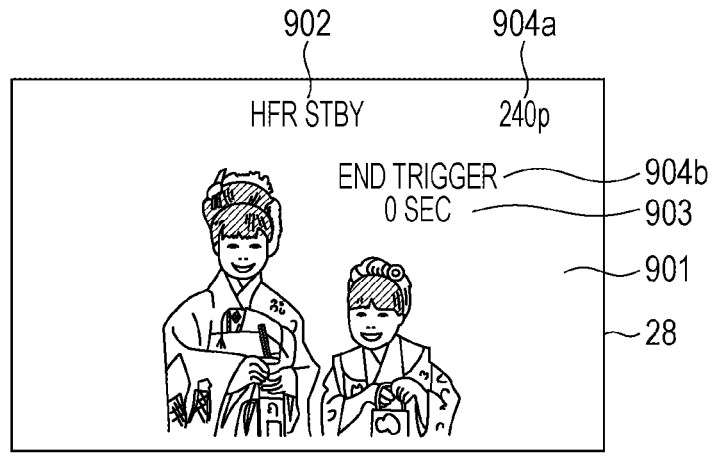
FIG. 9A to FIG. 9C illustrate examples of display in the display unit in the end trigger process.

Referring to FIG. 5, in Step S501, the system controller 50 provides a standby display, for example as illustrated on a standby screen 901 in FIG. 9A, in the display unit 28. In the standby display, a guide 902 indicating the standby state (the state in which start of recording is acceptable) is displayed. In addition, an item 904a indicating 240 fps, which is the recording frame rate, and an item 904b indicating that the current setting of the HFR recording is the end trigger are displayed in Step S501.

In Step S502, the system controller 50 initializes an end recording timer and records the end recording timer in the system memory 52. The end recording timer indicates the recording time recorded as the HFR recording. The maximum recording time of the HFR recording is 10 seconds in the present embodiment. The end recording timer is set to zero seconds in Step S502.

In Step S503, the system controller 50 displays the end recording timer indicating the recordable time, as illustrated by a guide 903 on the standby screen 901 in FIG. 9A. Since the recording of up to 10 seconds is enabled as the HFR recording in the present embodiment, the end recording timer indicates a time from zero seconds to 10 seconds. For example, if the recording start instruction is issued in Step S511 when the end recording timer indicates 5 seconds, the recording data recorded on the temporary recording medium 43 for five seconds before Step S511 is recorded on the recording medium 200.

In Step S504, the system controller 50 starts the counting of the end recording timer initialized in Step S502. In other words, in Step S504, the counting of the end recording timer initialized in Step S502 is started in the system timer 53. After Step S504, even without the recording start instruction from the user, the counting is continued, the counting of the end recording timer is reset every 10 seconds, and the time of the end recording timer is recorded in the system memory 52.

Figure 9B:
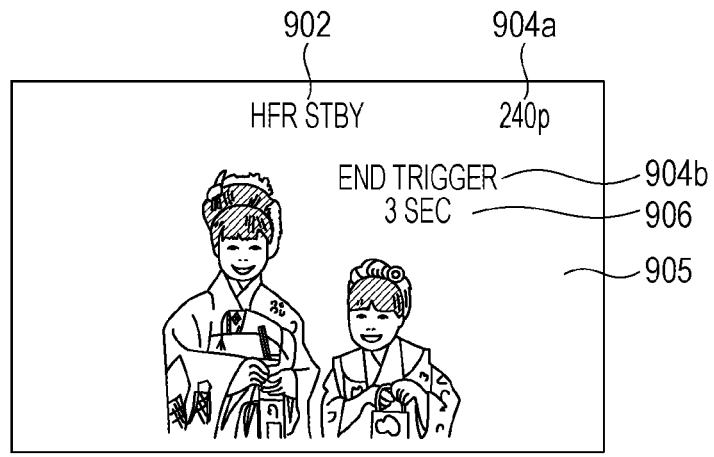

In Step S505, the system controller 50 starts recording an image captured by the imaging unit 22 on the temporary recording medium 43. As illustrated on a standby screen 905 in FIG. 9B, a guide 906 indicating the recording time is displayed in the display unit 28. The guide 906 indicates the recording time of an HFR movie currently recorded on the temporary recording medium 43 and indicates that the HFR recording is performed for a time corresponding to the guide 906 upon issuance of a shooting start instruction at this time.

In Step S506, the system controller 50 determines whether one second, which is the unit time, elapses in the end recording timer, the counting of which is started in Step S504. The unit time is a time when the display of the elapsed time in the end recording timer is updated, and the display of the time in the end recording timer is updated every one second in the present embodiment. The process goes to Step S507 if the system controller 50 determines that one second, which is the unit time in this example, elapses in the end recording timer (YES in Step S506) and, otherwise (NO in Step S506), the process goes to Step S511.

In Step S507, the system controller 50 counts up the display of the end recording timer by one second to update the end recording timer and records the display of the end recording timer in the system memory 52. In other words, the time of the end recording timer, which is initialized to zero seconds in Step S502, is incremented by one second from zero seconds, and the incremented time is recorded in the system memory 52 in Step S507. The time recorded as the HFR recording (the length of the current recordable time) is recorded in the system memory 52 in the above manner.

In Step S508, the system controller 50 updates the display of the end recording timer. Since a guide 906 in FIG. 9B indicates three seconds, the guide 906 is switched to four seconds when one second, which is the unit time, elapses. The display indicating the shooting time period is updated every unit time.

Figure 9C:
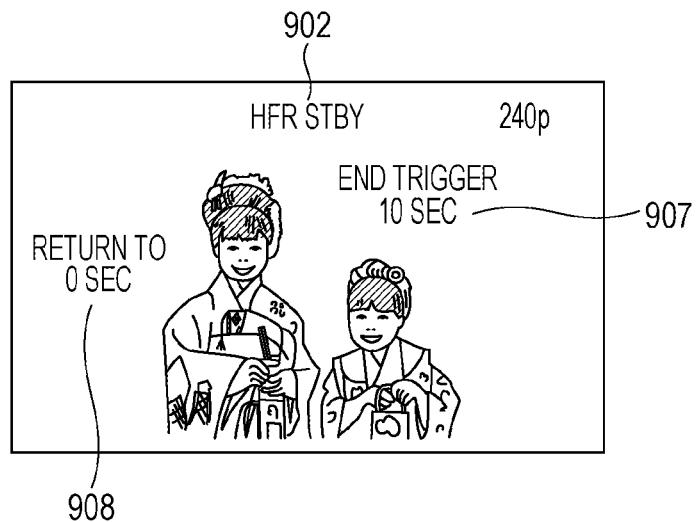

In Step 509, the system controller 50 determines whether the end recording timer recorded in the system memory 52 indicates 10 seconds. The process goes to Step S510 if the system controller 50 determines that the end recording timer indicates 10 seconds, that is, that the maximum time of the HFR recording to be recorded on the temporary recording medium 43 has elapsed (YES in Step S509) and, otherwise (NO in Step S509), the process goes to Step S511. A guide 907 in FIG. 9C indicates that the end recording timer is increased to 10 seconds. At this time, a display, such as a guide 908 in FIG. 9C, indicating that the end recording timer is reset to zero seconds (the recording data is deleted) if the shooting instruction is not issued may be provided. If the end recording timer indicates zero seconds, the HFR recording data recorded on the temporary recording medium 43 is deleted and the recording is started with the end recording timer being set to zero seconds.

In Step S510, the system controller 50 stops the counting of the end recording timer. In other words, the system controller 50 stops the counting in the system timer 53. Then, the process goes back to Step S501.

In Step S511, the system controller 50 determines whether the recording start instruction is issued. In the case of the end trigger, the HFR recording data recorded on the temporary recording medium 43 is recorded on the recording medium 200 in response to the recording start instruction. The recording start instruction is made by pressing the shutter button 61 (the shooting instruction is acceptable) in this embodiment. The process goes to Step S513 if the system controller 50 determines that the recording start instruction is issued (YES in Step S511) and, otherwise (NO in Step S511), the process goes to Step S512.

In Step S512, the system controller 50 determines whether the end trigger process is to be terminated. The end trigger process is terminated in response to switching to the normal recording, switching to the start trigger, transitioning to the playback mode, or turning off of the digital camera 100. The end trigger process is terminated if the system controller 50 determines that the end trigger process is to be terminated (YES in Step S512) and, otherwise (NO in Step S512), the process goes back to Step S506.

In Step S513, the system controller 50 determines whether starting the recording is enabled. The recording data is not recorded as a movie if the recording time is too short, as described above in Step S321 and Step S413. Accordingly, the recording process is not performed during a short recording time immediately after the start of the counting of the end recording timer in Step S504. In this example, starting the recording is disabled if the end recording timer indicates a time shorter than 0.5 seconds, which is the predetermined time, and starting the recording is enabled if the end recording timer indicates a time longer than or equal to 0.5 seconds in Step S513. In this embodiments, the starting of the recording in the end trigger process in FIG. 5 means starting the recording of the recording data that is captured on the recording medium 200 and does not mean the recording of an image that is captured after the recording start instruction is issued. The process goes to Step S514 if the system controller 50 determines that starting the recording is enabled (YES in Step S513) and, otherwise (NO in Step S513), the process goes back to Step S506. Before Step S513, the recording start instruction may not be accepted until the predetermined time elapses.

In Step S514, the system controller 50 stops the recording on the temporary recording medium 43.

In Step S515, the system controller 50 stops the counting of the end recording timer. In other words, the system controller 50 stops the counting in the system timer 53.

In Step S516, the system controller 50 turns off the display of the guide 906 indicating the recording time, displayed in the display unit 28.

In Step S517, the system controller 50 performs recording from the temporary recording medium 43 onto the recording medium 200. The writing guide 811 indicating that the recording on the recording medium 200 is being performed is displayed in the display unit 28 in Step S517, as described above in the start trigger process.

In Step S518, the system controller 50 determines whether the recording in Step S517 is terminated (e.g., completed). The process goes back to Step S501 if the system controller 50 determines that the recording from the temporary recording medium 43 onto the recording medium 200 is terminated (YES in Step S518) and, otherwise (NO in Step S518), the process goes back to Step S517.

As described above, in the present embodiment, the user is capable of knowing the amount of recording available in the HFR recording during each shooting mode. Specifically, the user is capable of knowing the remaining recording time that is available when using the start trigger and is capable of knowing the last number of seconds of the recording data that will be recorded if the instruction is issued at this time when using the end trigger. In the case of the start trigger, since the recording will be performed for 10 seconds after the time when the instruction is issued from the user, the user is capable of knowing the remaining recordable time through the count-down display. In the case of the end trigger, since the recording data is accumulated on the temporary recording medium 43 with no instruction from the user, the user is capable of knowing the recordable time through the count-up display. Since the recording data is deleted when 10 seconds elapses in the end trigger, a desired image is capable of being recorded if the shooting start instruction is issued before 10 seconds elapses. For example, when a scene in which a batter starts to run to a first base is to be shot after a few seconds of shooting since the batter swung a bat in a baseball game, it is desirable to start the recording if the recording time is nine seconds. In contrast, if the recording time is around three seconds, the scene when the batter swings the bat will not be missed even when the shooting is continued for a while. Displaying the recording time in the end trigger prevents the user from accidentally losing the recording data that has been acquired.

Another Embodiment

A center trigger process will now be described with reference to flowcharts in FIG. 6A and FIG. 6B as another embodiment. In the center trigger process, the recording data recorded on the temporary recording medium 43 immediately before activation of the trigger is recorded on the recording medium 200 in response to an instruction from the user, as in the end trigger process. In addition, the recording of the image on the temporary recording medium 43 is started while the shooting is performed for a predetermined time after the trigger and, then, the image on the temporary recording medium 43 is recorded on the recording medium 200, as in the start trigger process. In other words, the recording data before and after the recording instruction from the user is recorded in the center trigger process. The center trigger process may be selectable as one recording mode in the HFR recording. The center trigger process is realized by the system controller 50 that executes the programs recorded in the non-volatile memory 56, which may be included in the system memory 52.

Figure 6A:
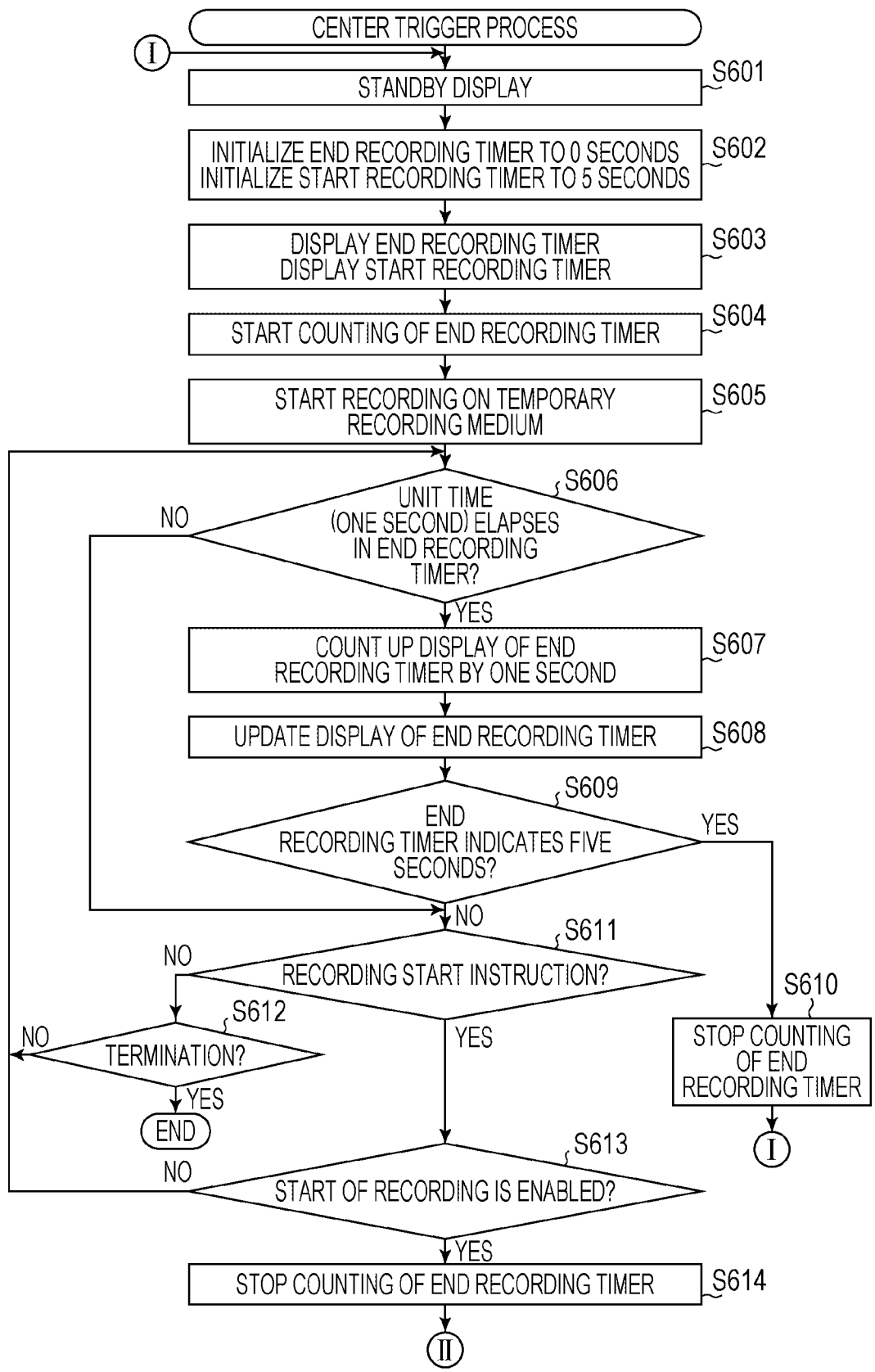
FIG. 6A and FIG. 6B are flowcharts illustrating an exemplary center trigger process.
Figure 10A:
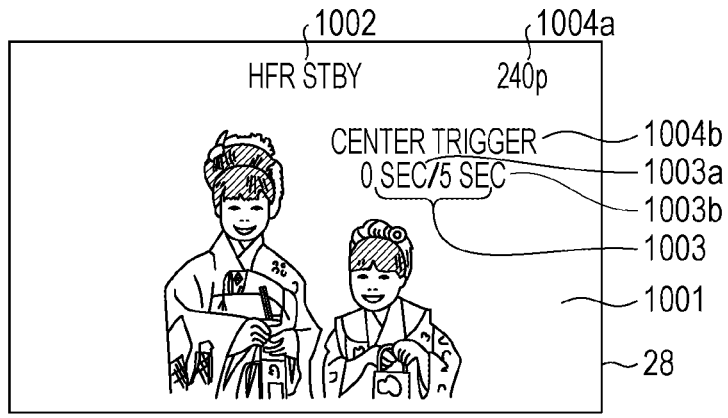
FIG. 10A to FIG. 10D illustrate examples of display in the display unit in the center trigger process.

Referring to FIG. 6A, in Step S601, the system controller 50 provides a standby display, for example as illustrated on a standby screen 1001 in FIG. 10A, on the display unit 28. In the standby display, a guide 1002 indicating the standby state (the state in which starting the recording is acceptable) is displayed. In addition, an item 1004a indicating 240 fps, which is the recording frame rate, and an item 1004b indicating that the current setting of the HFR recording is the center trigger are displayed in Step S601.

In Step S602, the system controller 50 initializes the end recording timer and the start recording timer and records the end recording timer and the start recording timer in the system memory 52. Each of the end recording timer and the start recording timer indicates the recording time recorded as the HFR recording, and the maximum recording time of the end recording timer and the start recording timer is five seconds in this example. The end recording timer is set to zero seconds and the start recording timer is set to five seconds in Step S602.

In Step S603, the system controller 50 displays the end recording timer (a guide 1003a) and the start recording timer (a guide 1003b), which indicate the recordable times, as illustrated by a guide 1003 on the standby screen 1001 in FIG. 10A. Since the recording of up to 10 seconds is enabled as the HFR recording in the present embodiment, the end recording timer is counted up from zero seconds to five seconds and the start recording timer is counted down from five seconds to zero seconds.

In Step S604, the system controller 50 starts the counting of the end recording timer initialized in Step S602. The counting of the end recording timer is performed every five seconds even with no recording start instruction from the user, and the end recording timer is recorded in the system memory 52 in Step S604.

Figure 10B:
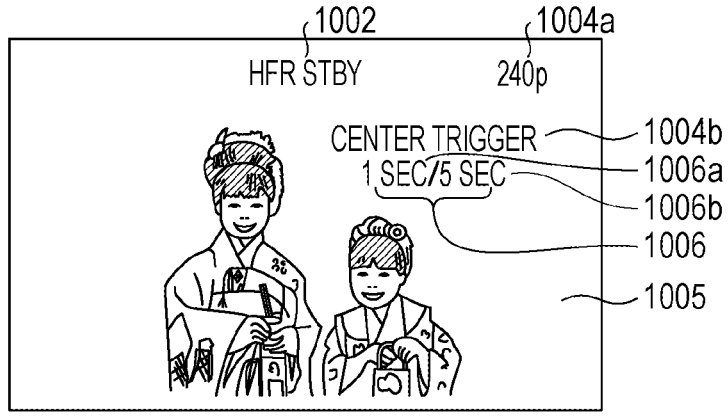

In Step S605, the system controller 50 starts recording an image captured by the imaging unit 22 on the temporary recording medium 43. As illustrated on a standby screen 1005 in FIG. 10B, a guide 1006 indicating the recording times is displayed by the display unit 28. The guide 1006 indicates the recording time of an HFR movie currently recorded on the temporary recording medium 43 and indicates that the HFR recording is made using the end trigger for a time corresponding to the guide 1006 upon issuance of the shooting start instruction at this time. In other words, upon issuance of the recording instruction at the timing of the guide 1006 in FIG. 10B, the recording is performed for one second before the instruction and five seconds after the instruction, as indicated by a guide 1006a and a guide 1006b, respectively.

Steps S606 to S608 are the same as Steps S506 to S508 in FIG. 5.

In Step S609, the system controller 50 determines whether the end recording timer recorded in the system memory 52 indicates five seconds. The process goes to Step S610 if the system controller 50 determines that the end recording timer indicates five seconds, that is, that the maximum time of the HFR recording to be recorded on the temporary recording medium 43 has elapsed (YES in Step S609) and, otherwise (NO in Step S609), the process goes to Step S611. When the end recording timer indicates five seconds, the HFR recording data recorded in the temporary recording medium 43 is deleted and the recording is started with the end recording timer being set to zero seconds. The same process as the end trigger process is repeated until the recording instruction is issued from the user in the center trigger process.

In Step S610, the system controller 50 stops the counting of the end recording timer and stops the counting in the system timer 53.

In Step S611, the system controller 50 determines whether the recording start instruction is issued. In the case of the center trigger, the HFR recording data recorded on the temporary recording medium 43 is recorded on the recording medium 200 in response to the recording start instruction and the recording data that is acquired after the instruction is also recorded. The recording start instruction is made by pressing the shutter button 61. The process goes to Step S613 if the system controller 50 determines that the recording start instruction is issued (YES in Step S611) and, otherwise (NO in Step S611), the process goes to Step S612.

In Step S612, the system controller 50 determines whether the center trigger process is to be terminated. The center trigger process is terminated in response to switching to the normal recording, switching to the start trigger or the end trigger, transitioning to the playback mode, or turning off of the digital camera 100. The center trigger process is terminated if the system controller 50 determines that the center trigger process is to be terminated (YES in Step S612) and, otherwise (NO in Step S612), the process goes back to Step S606.

In Step S613, the system controller 50 determines whether starting the recording is enabled. Starting the recording is disabled if the end recording timer indicates a time shorter than 0.5 seconds, which is the predetermined time, and starting the recording is enabled if the end recording timer indicates a time longer than or equal to 0.5 seconds in Step S613. The process goes to Step S614 if the system controller 50 determines that start of the recording is enabled (YES in Step S613) and, otherwise (NO in Step S613), the process goes back to Step S606.

Figure 10C:

In Step S614, the system controller 50 stops the counting of the end recording timer started in Step S604. At this time, the display in the display unit 28 is switched from the guide 1002 indicating the standby state to a guide 1007 indicating that a movie is being recorded, as illustrated in FIG. 10C. In addition, if the recording start instruction is issued in Step S611 when the end recording timer indicates three seconds, the recording is enabled for up to eight seconds resulting from addition of three seconds of the end recording timer (a guide 1008a) to five seconds of the start recording timer (a guide 1008b), as illustrated by a guide 1008 in FIG. 10C.

Figure 6B:
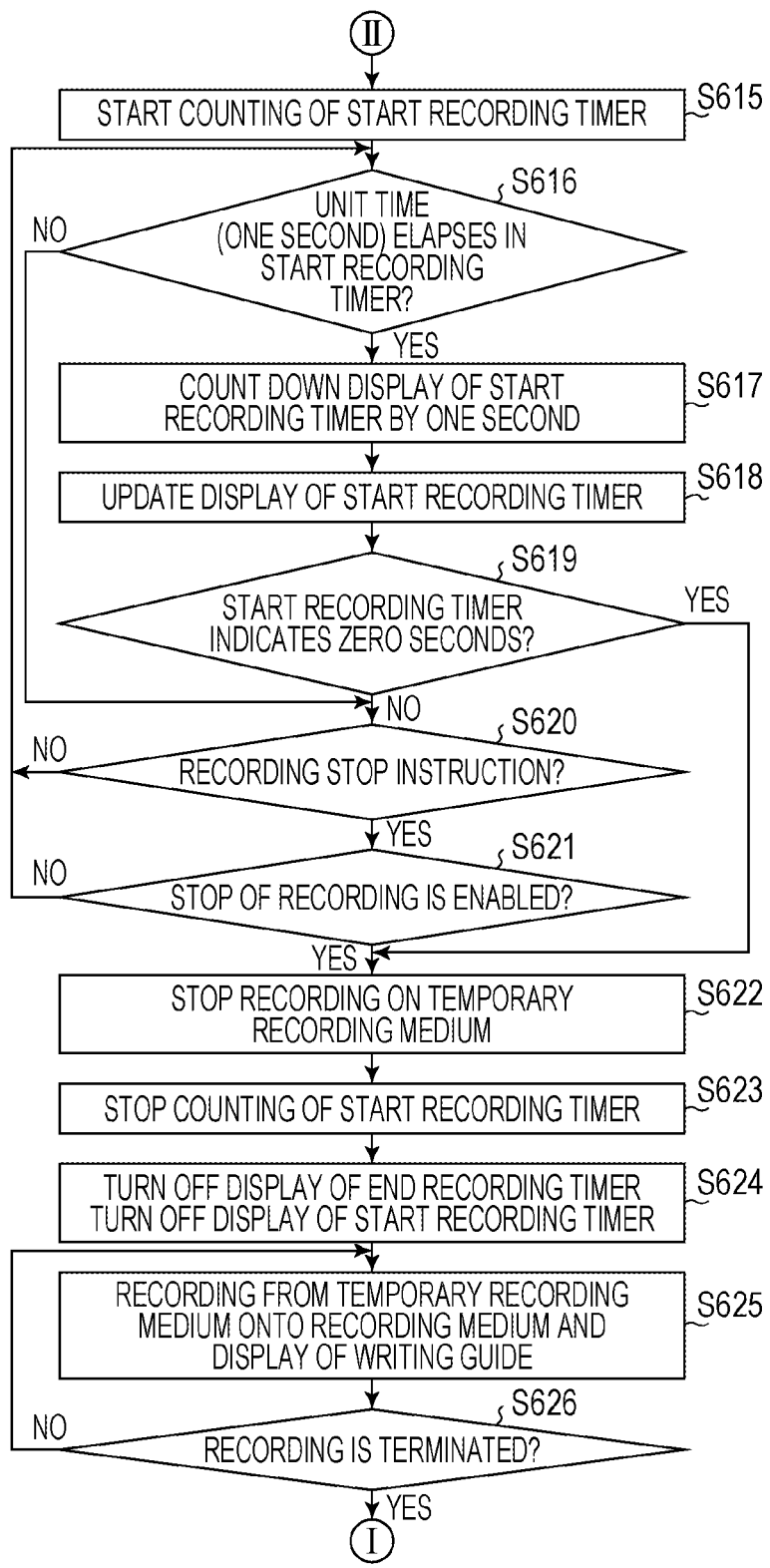

Referring to FIG. 6B, in Step S615, the system controller 50 starts the counting of the start recording timer initialized in Step S602.

Steps S616 to S623 are the same as Steps S408 to S415 in FIG. 4.

Figure 10D:
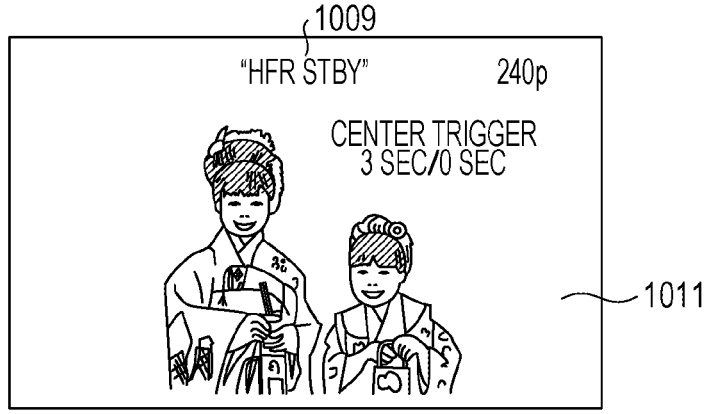

In Step S624, the system controller 50 turns off the display of the guide 1008 indicating the recording time, which is displayed in the display unit 28. In addition, for example, a guide 1009 illustrated on a recording stop screen 1011 in FIG. 10D is displayed. The guide 1009 indicates that the recording is stopped because the HFR recording is not capable of being continued and the recording is disabled because the digital camera 100 is in the standby state.

Steps S625 to S626 are the same as Steps S417 to S418 in FIG. 4. However, both the recording data acquired in Steps S605 to S614 and the recording data acquired in Steps S615 to S622 are recorded.

In the center trigger process described above, the user is capable of knowing the amount of recording in the HFR recording, which includes the amount of recording in the end trigger and the amount of recording in the start trigger.

Although in the example described in the above embodiments, in which the length of the time is directly displayed, for example, the time of the HFR recording is a few seconds, a display may be made in which the user intuitively knows the length of the time. FIG. 11A to FIG. 11G are other examples of displays. FIG. 11A and FIG. 11B are modifications of how the recording time is displayed in the start trigger. The amount of the recording time with respect to the maximum recording time (the amount of recording data) is illustrated in FIG. 11A and FIG. 11B. In the modification in FIG. 11A, when the start recording timer indicates 10 seconds, a bar indicating the recording time is displayed in white and the display mode of the bar is gradually varied in a manner indicated by a display mode 1101 from the left to the right in response to the shooting start instruction from the user. Then, the start recording timer is counted down and the entire bar is displayed in black, as in a display mode 1102, when the start recording timer indicates zero seconds. In the modification in FIG. 11B multiple items, instead of the bar, are arranged and the items are varied one by one with time (the items are sequentially varied in accordance with the recording time). All the four items are displayed in white when the start recording timer indicates 10 seconds, two of them are displayed in black, as in a display mode 1103, when five seconds elapses, and all the items are displayed in black when the start recording timer indicates zero seconds.

FIG. 11C is an example of how the recording time is displayed in the end trigger. The display mode of a circle is varied with time. FIG. 11A to FIG. 11C may be applicable to both the start trigger and the end trigger.

FIG. 11D and FIG. 11E are modifications of how the recording time is displayed in the start trigger and the end trigger, respectively. In the modification in FIG. 11D, the display mode of the bar is varied with time in response to the shooting start instruction from the user, and an item 1104 is moved with the position where the display mode is changed. The item 1104 indicates that stopping the recording is accepted. FIG. 11E is a modification in the end trigger. When the end recording timer indicates 10 seconds in the case in which the recording instruction is not issued with the end recording timer indicating nine seconds, the item 1104 is displayed in a light color in order to indicate that the recording data recorded on the temporary recording medium 43 is to be deleted. When the recording instruction is issued from the user with the end recording timer indicating five seconds, the length of the recording time is displayed, as illustrated by an item 1105.

FIG. 11F is a modification of how the recording time is displayed in the recording from the temporary recording medium 43 onto the recording medium 200. The modification in FIG. 11F indicates that the recording data on the temporary recording medium is gradually moved to the recording medium 200.

FIG. 11G is a modification of how the recording time is displayed in the center trigger. The display mode of the bar is varied with time, as in the modification in FIG. 11A. In (g-1) in FIG. 11G, a vertical line is drawn in the bar at the timing when the recording instruction is issued, and the display mode is varied from the line by the amount corresponding to the elapsed time of the start recording timer. In (g-2) in FIG. 11G, the time corresponding to the recording data recorded on the temporary recording medium is displayed at the timing when the recording instruction is issued, and the display mode is varied from the position of the center line by the amount corresponding to the elapsed time of the start recording timer. The user is capable of knowing the time of the end recording timer and the time of the start recording timer through the display illustrated in FIG. 11G also in the center trigger.

Instead of the examples of display illustrated in FIG. 11A to FIG. 11G, the amount of recording may be displayed in a percentage, which indicates the ratio of the amount of recording to the maximum recording time of 10 seconds, or the amount of recording may be displayed in bytes or sectors.

As a modification of the display of the time, in the start trigger, it may be indicated that the maximum recording time is 10 seconds, and the recording time may be counted up for display (indicating the amount of recording). Similarly, in the end trigger, the recording time may be counted down (indicating the remaining time until the recording is stopped).

Although the HFR recording is exemplified in the above embodiments, the embodiments are applicable to shooting with a limited recording time, such as recording audio, continuous shooting, or shooting having a high image quality and a high recording capacity. In addition, the embodiments are applicable to shooting other than the HFR shooting as long as either of the end trigger and the start trigger is capable of being selected in the shooting.

During a time period in which the recording time is short and starting or stopping the recording is disabled, the guide indicating the shooting time may be grayed out or a guide indicating the recording is disabled may be displayed. If the recording is stopped when the maximum recording time elapses, display may be made, which indicates that the recording will be stopped after a few seconds to the user.

The lengths of the times concerning the HFR recording in the above embodiments is not limited to the above ones. The length of the time when the HFR recording is enabled may be a time, such as five seconds or 15 seconds, depending on the temporary recording medium 43 and the recording medium 200, and the recording time necessary for a movie may be a time, such as one second or 0.3 seconds, instead of 0.5 seconds. When video data of a certain time is constantly recorded on the temporary recording medium 43 in the end trigger, the recording time corresponding to the elapsed time may not be displayed. In addition, the unit time when the elapsed time is updated may not be one second and may be, for example, 0.5 seconds or 0.1 seconds.

The variety of control performed by the system controller 50 in the above embodiments may be performed by one piece of hardware. Alternatively, multiple pieces of hardware may share the processing to control the entire apparatus.

While the embodiments of the present disclosure have been described using specific examples, the present disclosure is not limited to the specific embodiments and examples, and it is to be understood that changes and variations may be made without departing from the spirit or scope of the present disclosure. The embodiments described above are only examples and may be appropriately combined.

Although the case is exemplified in the above embodiments in which the present disclosure is applied to the digital camera 100, the present disclosure is not limited to this and is applicable to a recording control apparatus capable of recording the recording data before the recording instruction is issued. Specifically, the present disclosure is applicable to, for example, a mobile phone terminal, a mobile image viewer, a printer apparatus provided with a finder, a digital photo frame, a music player, a game machine, or an electronic book reader.

Other Embodiments

Some embodiments of the present disclosure are realized by performing the foregoing processes. Specifically, software realizing the functions of the above embodiments may be supplied to a system or an apparatus via a network or various recording media, and one or more computers (or a central processing unit (CPU) or a micro processing unit (MPU)) in the system or the apparatus may read out program codes for execution. In this case, the programs and a non-volatile recording medium having the programs stored thereon compose some embodiments.

Some embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-167288 filed in Aug. 31, 2017, which is hereby incorporated by reference herein in its entirety.

What is claimed is:
1. A display control apparatus comprising:
an acquiring unit configured to acquire image data captured by an imaging unit;
an accepting unit configured to accept a recording instruction;
a switching unit configured to be capable of switching between a first recording mode in which the image data acquired by the acquiring unit before the recording instruction is accepted is recorded on a recording medium and a second recording mode in which the image data acquired by the acquiring unit after the recording instruction is accepted is recorded on the recording medium; and
a control unit configured to perform control such that guide information concerning the image data to be recorded on the recording medium is displayed,
wherein the guide information includes an amount,
wherein, in a case where the image data is acquired by the acquiring unit in the first recording mode, the display control unit performs control to display the guide information such that,
(i) the amount increases according to time that elapses from zero,
(ii) the amount becomes zero when a certain amount of time elapses without accepting the recording instruction,
(iii) increasing of the amount according to time that elapses starts after the amount becomes zero without recording the image data on the recording medium, and
(iv) increasing of the amount stops and the image data, which corresponds to the amount displayed when the recording instruction is accepted before the certain amount of time elapses, is recorded on the recording medium when the recording instruction is accepted, and wherein, in a case where the image data is acquired by the acquiring unit in the second recording mode, the display control unit performs control to display the guide information such that the amount decreases according to time that elapses after accepting the recording instruction, and then the decreasing of the amount stops and the image data is recorded on the recording medium when the certain amount of time elapses after accepting the recording instruction.

2. The display control apparatus according to claim 1, wherein the amount concerns an amount of the image data to be recorded on the recording medium.

3. The display control apparatus according to claim 1, wherein the amount concerns a length of time of the image data to be recorded on the recording medium.

4. The display control apparatus according to claim 3, wherein the length of time is counted up with the time that elapses in the first recording mode and the length of time is counted down with the time that elapses in the second recording mode.

5. The display control apparatus according to claim 1, wherein the first recording mode and the second recording mode are recording modes for recording the image data of the certain amount of time.

6. The display control apparatus according to claim 5, wherein the display control unit performs control such that, in the first recording mode, the amount indicates a length of time of the image data acquired by the acquiring unit before the recording instruction is accepted and, in the second recording mode, the amount indicates a length of time until the acquisition of the image data of the certain amount of time is completed.

7. The display control apparatus according to claim 5, wherein the display control unit varies a display mode of the guide information when a time of the image data acquired by the acquiring unit before the recording instruction is accepted reaches the certain amount of time in the first recording mode.

8. The display control apparatus according to claim 5, wherein the display control unit terminates the display of the guide information upon acceptance of the recording instruction in the first recording mode and terminates the display of the guide information upon elapse of the certain amount of time since the acceptance of the recording instruction and completion of the acquisition of the image data of the certain amount of time in the second recording mode.

9. The display control apparatus according to claim 5, further comprising:
a recording control unit configured to control the image data acquired by the acquiring unit so as to be recorded on the recording medium,
wherein the recording control unit controls the image data acquired by the acquiring unit before the acceptance of the recording instruction so as to be recorded on the recording medium upon acceptance of the recording instruction in the first recording mode and controls the image data of the certain amount of time, acquired by the acquiring unit after the acceptance of the recording instruction, so as to be recorded on the recording medium upon acceptance of the recording instruction in the second recording mode.

10. The display control apparatus according to claim 5, wherein the display control unit starts the increase of the amount at a beginning of the acquisition of the image data to be recorded on the recording medium by the acquiring unit in the first recording mode and starts the decrease of the amount upon acceptance of the recording instruction in the second recording mode.

11. The display control apparatus according to claim 1, further comprising:
a storage unit configured to temporarily store the image data acquired by the acquiring unit,
wherein the amount concerns a length of time of the image data temporarily stored in the storage unit.

12. The display control apparatus according to claim 1, wherein the first recording mode and the second recording mode are recording modes for recording image data shot at a high frame rate.

13. The display control apparatus according to claim 1, wherein the first recording mode and the second recording mode are recording modes for recording a movie shot at a high frame rate.

14. The display control apparatus according to claim 1, wherein, in the second recording mode, recording of the image data is stopped without an operation by a user in a case where the certain amount of time has elapsed.

15. The display control apparatus according to claim 1, wherein, in the first recording mode, the certain amount of time is a maximum recordable time length of the image data.

16. The display control apparatus according to claim 1, wherein image data of an amount corresponding to the displayed guide information is recorded in both of the first recording mode and the second recording mode.

17. A method of controlling a display control apparatus, the method comprising:
acquiring image data captured by an imaging unit;
accepting a recording instruction; and
performing display control such that guide information concerning the image data to be recorded on a recording medium is displayed,
wherein, in the display control, the guide information includes an amount,
wherein, when a first recording mode, in which the image data acquired before the recording instruction is accepted is recorded on the recording medium, is set,
(i) the amount increases according to time that elapses from zero,
(ii) the amount becomes zero when a certain amount of time elapses without accepting the recording instruction,
(iii) increasing the amount according to the time that elapses starts after the amount becomes zero without recording the image data on the recording medium, and
(iv) increasing the amount stops and the image data, which corresponds to the amount displayed when the recording instruction is accepted before the certain amount of time elapses, is recorded on the recording medium when the recording instruction is accepted, and
wherein, when a second recording mode, in which the image data acquired after the recording instruction is accepted is recorded on the recording medium, is set, the amount decreases according to time that elapses after accepting the recording instruction, and then the decreasing of the amount stops and the image data is recorded on the recording medium when the certain amount of time elapses after accepting the recording instruction.

18. A non-volatile computer-readable medium storing a program to cause a computer to perform operations comprising:

acquiring image data captured by an imaging unit;
accepting a user input of a recording instruction; and
performing display control such that guide information concerning the image data to be recorded on a recording medium is displayed,
wherein the guide information includes an amount,
wherein, when a first recording mode, in which the image data acquired before the recording instruction is accepted is recorded on the recording medium, is set,
(i) the amount increases according to time that elapses from zero,
(ii) the amount of time becomes zero when a certain amount of time elapses without accepting the user input of the recording instruction,
(iii) increasing the amount according to the time that elapses starts after the amount becomes zero without recording the image data on the recording medium, and
(iv) increasing the amount stops and the image data, which corresponds to the amount displayed when the user input of the recording instruction is accepted before the certain amount of time elapses, is recorded on the recording medium, and
wherein, when a second recording mode, in which the image data acquired after the user input of the recording instruction is accepted is recorded on the recording medium, is set, the amount decreases according to time that elapses after accepting the user input of the recording instruction, and then the decreasing of the amount stops and the image data is recorded on the recording medium when the certain amount of time elapses after accepting the user input of the recording instruction.

* * * * *